United States Patent
Yang et al.

(10) Patent No.: US 10,795,784 B2
(45) Date of Patent: *Oct. 6, 2020

(54) METHODS, SYSTEMS, AND COMPUTER READABLE STORAGE DEVICES FOR MANAGING FAULTS IN A VIRTUAL MACHINE NETWORK

(71) Applicant: AT&T Intellectual Property I, L.P., Atlanta, GA (US)

(72) Inventors: Chen-Yui Yang, Marlboro, NJ (US); Paritosh Bajpay, Edison, NJ (US); Chang-Han Jong, Warrenville, IL (US); Chaoxin Charles Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/954,042

(22) Filed: Apr. 16, 2018

(65) Prior Publication Data
US 2018/0239679 A1 Aug. 23, 2018

Related U.S. Application Data

(63) Continuation of application No. 14/572,335, filed on Dec. 16, 2014, now Pat. No. 9,946,614.

(51) Int. Cl.
*G06F 11/00* (2006.01)
*G06F 11/20* (2006.01)
*G06F 11/14* (2006.01)

(52) U.S. Cl.
CPC ...... *G06F 11/2023* (2013.01); *G06F 11/1484* (2013.01); *G06F 11/1438* (2013.01)

(58) Field of Classification Search
CPC ............ G06F 11/1484; G06F 11/2028; G06F 11/2025; G06F 11/203; G06F 2009/4557;
(Continued)

(56) References Cited

U.S. PATENT DOCUMENTS

| 5,751,933 A | * | 5/1998 | Dev | ..................... G06F 11/2257 |
| | | | | 714/4.12 |
| 6,125,387 A | | 9/2000 | Simonoff et al. | |

(Continued)

FOREIGN PATENT DOCUMENTS

| JP | 2007172003 A | 7/2007 |
| JP | 2009187254 A | 8/2009 |

(Continued)

OTHER PUBLICATIONS

Chowdhury, N. M., and Raouf Boutaba. "A survey of network virtualization." Computer Networks 54.5 (2010): 862-876. <https://cs.uwaterloo.ca/research/tr/2008/CS-2008-25.pdf>.

(Continued)

*Primary Examiner* — Bryce P Bonzo
*Assistant Examiner* — Jeison C Arcos

(57) ABSTRACT

Faults are managed in a virtual machine network. Failure of operation of a virtual machine among a plurality of different types of virtual machines operating in the virtual machine network is detected. The virtual machine network operates on network elements connected by transport mechanisms. A cause of the failure of the operation of the virtual machine is determined, and recovery of the virtual machine is initiated based on the determined cause of the failure.

20 Claims, 9 Drawing Sheets

(58) Field of Classification Search
CPC ....... G06F 2009/45575; G06F 9/45558; G06F 9/45533
See application file for complete search history.

(56) References Cited

U.S. PATENT DOCUMENTS

| | | | |
|---|---|---|---|
| 6,199,179 B1 | 3/2001 | Kauffman et al. | |
| 7,200,144 B2 | 4/2007 | Terrell et al. | |
| 7,290,168 B1 | 10/2007 | Dekoning | |
| 7,426,580 B2 | 9/2008 | Monga et al. | |
| 7,440,933 B2* | 10/2008 | Abrashkevich | G06N 5/022 706/46 |
| 7,565,568 B1 | 7/2009 | Kumar et al. | |
| 7,689,871 B2* | 3/2010 | Hagman | G05B 19/0428 700/19 |
| 7,711,978 B1 | 5/2010 | Roy et al. | |
| 7,770,059 B1 | 8/2010 | Glade et al. | |
| 7,849,168 B2 | 12/2010 | Utsunomiya et al. | |
| 8,166,474 B1 | 4/2012 | Delco et al. | |
| 8,214,467 B2 | 7/2012 | Dake et al. | |
| 8,332,688 B1 | 12/2012 | Tompkins | |
| 8,479,048 B2* | 7/2013 | Morimura | G06F 11/0709 709/201 |
| 8,661,291 B2* | 2/2014 | Li | G06F 11/07 714/26 |
| 8,725,854 B2 | 5/2014 | Edsall et al. | |
| 8,776,050 B2* | 7/2014 | Plouffe | G06F 9/45537 718/1 |
| 8,817,621 B2 | 8/2014 | Casado et al. | |
| 8,837,491 B2 | 9/2014 | Huynh Van et al. | |
| 8,837,493 B2 | 9/2014 | Casado et al. | |
| 8,856,589 B1 | 10/2014 | Glade et al. | |
| 9,130,912 B2* | 9/2015 | Agrawal | G06F 9/45558 |
| 9,183,072 B1* | 11/2015 | Makuch | G06F 11/0709 |
| 2001/0014913 A1 | 8/2001 | Barnhouse et al. | |
| 2004/0153844 A1 | 8/2004 | Ghose et al. | |
| 2004/0225381 A1* | 11/2004 | Ritz | G06F 11/0709 700/26 |
| 2007/0043860 A1 | 2/2007 | Pabari et al. | |
| 2008/0008202 A1 | 1/2008 | Terrell et al. | |
| 2008/0181227 A1 | 7/2008 | Todd | |
| 2008/0270709 A1 | 10/2008 | Smits et al. | |
| 2009/0138752 A1* | 5/2009 | Graham | G06F 9/45558 714/4.1 |
| 2009/0185500 A1 | 7/2009 | Mower et al. | |
| 2011/0307886 A1* | 12/2011 | Thanga | G06F 9/5077 718/1 |
| 2012/0137285 A1* | 5/2012 | Glikson | G06F 9/4856 718/1 |
| 2012/0151476 A1* | 6/2012 | Vincent | G06F 9/45558 718/1 |
| 2013/0058255 A1 | 3/2013 | Casado et al. | |
| 2013/0074066 A1* | 3/2013 | Sanzgiri | H04L 49/70 718/1 |
| 2013/0159490 A1 | 6/2013 | Huh et al. | |
| 2013/0238785 A1* | 9/2013 | Hawk | G06F 9/5072 709/224 |
| 2014/0241247 A1 | 8/2014 | Kempf et al. | |
| 2015/0358248 A1* | 12/2015 | Saha | H04L 47/70 709/226 |

FOREIGN PATENT DOCUMENTS

| | | |
|---|---|---|
| JP | 2011081579 A | 4/2011 |
| WO | WO 2012048619 A1 | 4/2012 |

OTHER PUBLICATIONS

Dawson, Philip, and Thomas J. Bittman. "Virtualization Changes Virtually Everything." Gartner Special Report (2008). <http://download.microsoft.com/download/7/d/4/7d46b8f4-fbcd-4066-9446-7c66152a0196/Virtualisation%20Changes%20Virtually%20Everything%20-%20Philip%20Dawson,%20Gartner.pdf>.

Gogouvitis, Spyridon, et al. "Workflow management for soft real-time interactive applications in virtualized environments." Future generation computer systems 28.1 (2012): 193-209. <http://users.ntua.gr/spyrosg/citeseer/FGCS_UCC_2010_AAM.pdf>.

Brandt, Jim, et al. "Resource monitoring and management with OVIS to enable HPC in cloud computing environments." Parallel & Distributed Processing, 2009. IPDPS 2009. IEEE International Symposium on. IEEE, 2009. <https://ovis.ca.sandia.gov/mediawiki/images/0/01/OVISCloud.pdf>.

Ed, Thomas, Ricardo Puttini, and Zaigham Mahmood. Cloud Computing: Concepts, Technology & Architecture. Pearson Education, 2013. http://servicetechbooks.com/pdf/cloud_sample_chapter_1.pdf.

Wood, Timothy. Improving data center resource management, deployment, and availability with virtualization. Diss. University of Massachusetts Amherst, 2011. <http://scholarworks.umass.edu/cgi/viewcontent.cgi?article=1495&context=open_access_dissertations>.

* cited by examiner

| | CONDITION | RECOVERY | IMPACT |
|---|---|---|---|
| 1 | Process failure on traffic processing VM | Process is restarted by Guest OS middleware | Transient calls being handled by the process are lost. Stable calls are preserved. |
| 2 | Failure of 1 traffic processing VM/host | 1) Detected by Guest OS middleware<br>2) Alarm sent to NPE<br>3) NPE instantiates new VM and adds to cluster<br>4) Guest OS middleware detects new VM added | Transient calls being handled by the VM are lost. Stable calls are preserved. |
| 3 | Failure of 2 or more traffic processing VMs/hosts in cluster (within 2 minutes of each other) | 1) Detected by Guest OS middleware. Cluster is restarted.<br>2) Traffic is handled by the rest of the clusters (on-site and/or across both redundant sites). | All calls being handled by the cluster are lost. |
| 4 | Process failure on load balancing VM | 1) Process is restarted by Guest OS middleware | No impact to calls. |
| 5 | Failure of 1 load balancing VM/host | 1) All requests are routed to the other LB.<br>2) Alarm sent to<br>3) NPE instantiates new VM and adds to cluster<br>4) Guest OS middleware detects new VM added | No impact to calls. |
| 6 | Failure of both load balancing VMs/hosts | 1) Detected by Guest OS middleware. Cluster is restarted.<br>2) Triggers failover to other site or another on-site cluster. | All calls being handled by the cluster are lost. |

FIG. 7

| | CONDITION | RECOVERY | IMPACT |
|---|---|---|---|
| 7 | Process failure on system controller VM | 1) Process is restarted by Guest OS middleware | No impact to calls. |
| 8 | Failure of 1 system controller VM/host | 1) Alarm sent to NPE<br>2) NPE instantiates new VM and adds to cluster<br>3) Guest OS middleware detects new VM added | No impact to calls. |
| 9 | Failure of both system controller hosts (within 2 minutes of each other) | 1) Traffic is handled by the rest of (on-site and/or across both redundant sites) ..<br>2) Cloud infrastructure detects and sends alarm sent to NPE<br>3) NPE instantiates new cluster | All calls being handled by the cluster are lost. |
| 10 | Failure of 1 TP and 1 SC VM/hosts within 2 minutes | 1) See independent failure scenarios 2 and 7<br>2) Note: The cluster is not restarted | No impact to calls |

FIG. 8

METHODS, SYSTEMS, AND COMPUTER READABLE STORAGE DEVICES FOR MANAGING FAULTS IN A VIRTUAL MACHINE NETWORK

TECHNICAL FIELD

This application is a continuation of U.S. patent application Ser. No. 14/572,335, filed Dec. 16, 2014, now U.S. Pat. No. 9,946,614, which is currently allowed and is herein incorporated in its entirety.

The present disclosure relates generally to virtual machines and, more particularly, to managing faults in a virtual machine network.

BACKGROUND

To expand the number of operating systems and application programs that run on a computer system, virtualized computer systems have been developed. In a virtualized computer system, a given computer having one type of CPU, called a host, includes an emulator program, referred to as a hypervisor that allows the host computer to emulate the instructions of an unrelated type of CPU, called a guest. The host computer executes an application that will cause one or more host instructions to be called in response to a given guest instruction. The host computer can run both software designed for its own hardware architecture and software written for a computer having an unrelated hardware architecture. In this type of arrangement, the guest computer system is a "virtual machine" as it only exists in the host computer system as a pure software representation of the operation of one specific hardware architecture.

Virtual computing systems have evolved into networks of virtual machines running on different network elements. Network Functions Virtualization (NFV) is a network architecture that uses virtualization related technologies to virtualize entire classes of network node functions into building blocks that may be connected together to provide communication services. A proposed standard for an NVF may be found in the European Telecommunication Standards Institute (ETSI) NVF Group Specification, Version 1.1.1 (October 2013).

A virtualized network function (VNF) is a software implementation of a network function that can be deployed on a Network Function Virtualization Infrastructure (NFVI). A VNF is a type of virtual application that may be loaded onto a virtual machine. A VNF may include one or more virtual machines running different software and processes, on top of industry standard high volume servers, switches and storage, or even cloud computing infrastructure, instead of having custom hardware appliances for each network function.

The NFVI includes all the hardware and software components which build up the environment in which VNFs are deployed. The NFVI can span across several locations. The network(s) providing connectivity between these locations are considered to be part of the NFVI Network Functions Virtualization Management and Orchestration Architectural Framework (NFV-MANO Architectural Framework) is the collection of all functional blocks, data repositories used by these functional blocks, and reference points and interfaces through which these functional blocks exchange information for the purpose of managing and orchestrating the NFVI and VNFs.

Virtual machine networks have the advantage of providing failover solutions when a fault in operation of a virtual machine occurs. That is, a virtual machine may be switched from a network element on which it is operating to a redundant, standby, or extra network element upon the failure or abnormal termination of the current network element. With the growth of the number of virtual machines operating on network elements, the task of keeping track of failover and recovery in virtual machines has become more and more cumbersome. The importance of a successful failover solution dramatically increases as more organizations adopt virtual machines into data centers. However, protecting applications in a virtual machine network is not an easy task.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment a method is provided for managing faults in a virtual machine network. The method includes detecting, by a processor, failure of operation of a virtual machine among a plurality of different types of virtual machines operating in the virtual machine network. The virtual machine network operates on network elements connected by transport mechanisms. The method further includes determining, by the processor, a cause of the failure of the operation of the virtual machine and initiating recovery of the virtual machine based on the determined cause of the failure.

According to another illustrative embodiment, a system is provided for managing faults in a virtual machine network. The system includes processor and a memory. The memory has instructions stored thereon which, when executed by the processor, cause the processor to perform operations. The operations comprise detecting failure of operation of a virtual machine among a plurality of different types of virtual machines operating in the virtual machine network. The virtual machine network operates on network elements connected by transport mechanisms. The operations further comprise determining a cause of the failure of the operation of the virtual machine and initiating recovery of the virtual machine based on the determined cause of the failure.

According to another illustrative embodiment, a computer readable storage device is provided for use in managing faults in a virtual machine network. The computer readable storage device has instructions stored thereon which, when executed by a processor, cause the processor to perform operations. The operations comprise detecting failure of operation of a virtual machine among a plurality of different types of virtual machines operating in the virtual machine network. The virtual machine network operates on network elements connected by transport mechanisms. The operations further comprise determining a cause of the failure of the operation of the virtual machine and initiating recovery of the virtual machine based on the determined cause of the failure.

BRIEF DESCRIPTION OF THE DRAWINGS

FIGS. 7 and 8 illustrate examples of fault conditions, recovery strategy and impact according to an illustrative embodiment.

DETAILED DESCRIPTION

Figure 1:
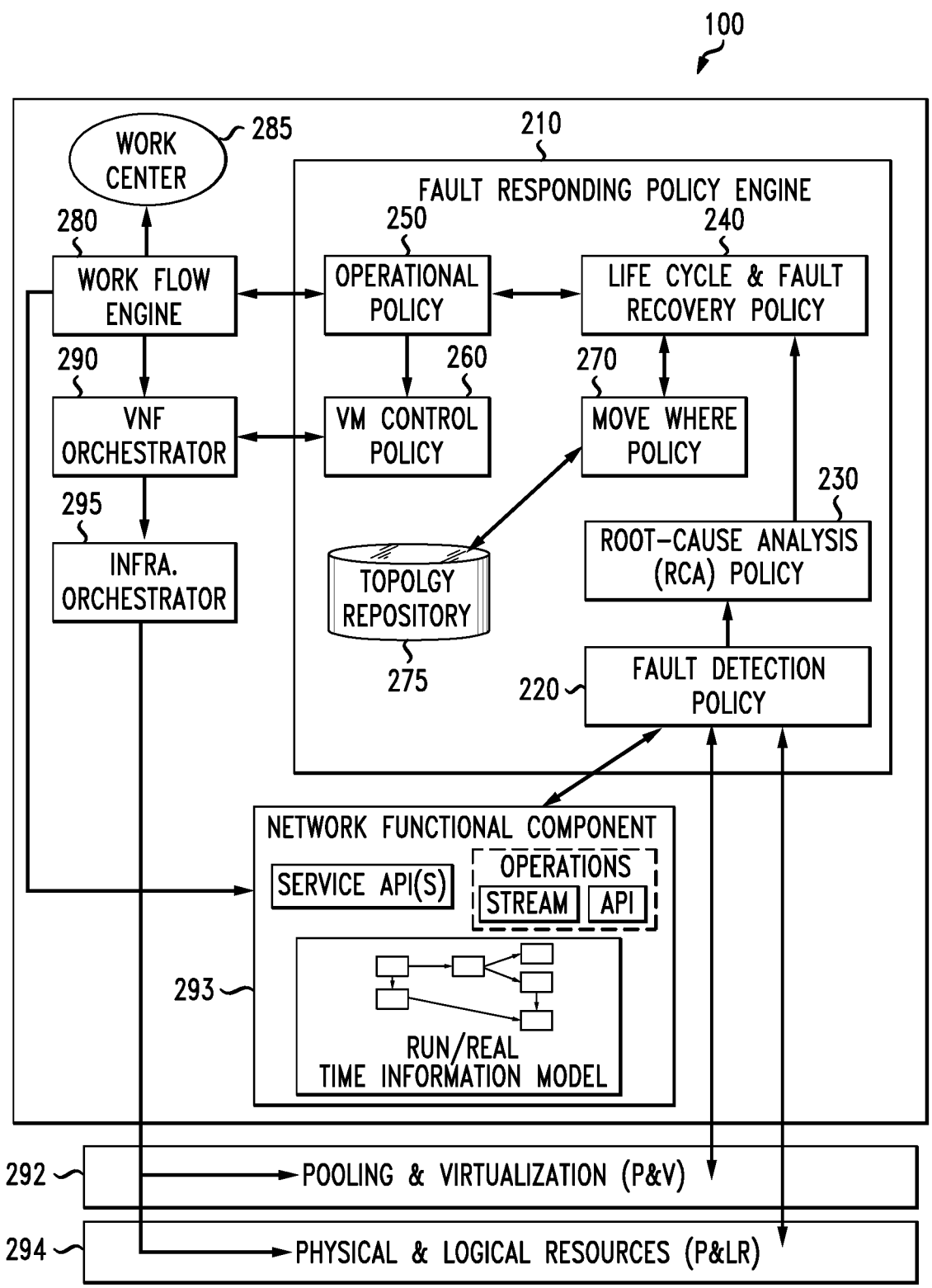
FIG. 1 illustrates a network environment in which a fault responding policy engine may be implemented according to an illustrative embodiment.

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Cloud computing has made the task of tracking faults in virtual machines in a virtual machine network particularly daunting. A communication application in a cloud typically consists of many specialized virtual machine applications. Such applications include, for example, load balancer virtual machines for various communication protocols (Session Initiation Protocol (SIP), Diameter, Lightweight Directory Access Protocol (LDAP), etc.), database virtual machines (relational or Not Only Structured Query Language (noSQL), etc.), various caching or proxy virtual machines, Operations/Administrative/Maintenance (OAM)/control/monitoring virtual machines, etc. These various virtual machines have different fault signatures and different service impacts and thus demand appropriate fault treatments.

In a large scale cloud that hosts a communication application, there will be a large number (thousands or more) of various application virtual machines that are spread across a larger number of hosts, interconnected by Transmission Control Protocol (TCP)/Internet Protocol (IP) transport. Today, large scale clouds have a layer 2/3 design and employ network security policies that make it impractical to treat such a large cloud as a "flat" (or fully meshed) network. Various application virtual machines are typically grouped (or interconnected) into clusters, sub-domains or zones to make it possible for administration. For example, there may be limits on how many application virtual machines an OAM virtual machine can monitor. There may be limits on how many backend application processing virtual machines a load balancer can support. There may be limits on how much data a database virtual machine can store and replicate. The relationship of virtual machines within a zone or sub-domain has to be maintained when the cloud needs to instantiate a new virtual machine to replace a virtual machine in fault.

Virtual machines are connected via one or more virtual local area networks (VLANs) and layer 2/3 interconnects. A VLAN is a logical group of workstations, servers and network devices that appear to be on the same LAN despite their geographical distribution. A VLAN allows several networks to work virtually as an LAN.

Due to the nature of application processing and performance requirements, the layer 2/3 interconnects for virtual machines vary greatly. Some virtual machines need to be interconnected via the same layer 2 (L2) switch, some virtual machines can be connected on the same VLAN, some virtual machines can be connected via layer 3 (L3) routing in the same physical site, and some virtual machines can be connected via Wide Area Network (WAN) L3 routing. Furthermore, a virtual machine may require multiple VLANs for different purposes, such as real-time signaling VLAN, real-time data VLAN or Internet Small Computer System Interface (iSCSI) VLAN, near-real-time OAM VLAN, near-real-time data replication VLAN, etc.

Understanding the variety of application virtual machine signatures, inter-virtual machine relationships, and dependency on L2/L3 transport mechanisms, one can further understand that there will be many different fault events that can cause malfunction of an application virtual machine. For example, a L2/L3 router problem may cause malfunction (and trigger alarms) from many components including many application virtual machines on hosts interconnected by the router. A memory leak from an application virtual machine may cause problem for other virtual machines running on the same host.

Fault treatments in a cloud are commonly viewed as simply spinning off another application virtual machine somewhere in the cloud. This view assumes that hardware resources in the cloud are almost "infinite", which is impractical. Costs of site conditioning, engineering, space, power and hardware limit the number of spare hardware a cloud can afford. As commodity hardware has a short life cycle, it becomes inefficient to deploy too many spare hardware components, which reach their end of life in just a few years, in a cloud. With limited spare hardware in a cloud, special care has to be taken when some L2/L3 transport mechanism fault causes a large number of virtual machines to malfunction. A cloud service orchestrator may not be able to find sufficient number of spare hosts to initiate failover.

According to illustrative embodiments, failures of virtual machines in a virtual machine network are treated in a manner such that spawning of new instances of virtual machines is reduced to preserve hardware resources. According to an illustrative embodiment, a Fault Responding Policy Engine provides for automatic failover detection and restoration. Aspects of the Fault Responding Policy Engine include a Fault Detection Policy, a Root-Cause Analysis (RCA) Policy, a Life Cycle and Fault Recovery Policy, an Operational Policy, a Virtual Machine Control and Failover Protection Policy, and a Move Where policy. These policies may be included in and performed by the Fault Responding Policy Engine, as described in further detail below.

FIG. 1 illustrates a network environment 100 in which a fault responding policy engine (FRPE) may be implemented according to an illustrative embodiment. Referring to FIG. 1, a Fault Responding Policy Engine 210 may be implemented with a computing device that includes various policies which may be implemented as computer-readable instructions stored in a memory and executed by a processor, as described in detail with reference to FIG. 9.

The FRPE 210 includes a Fault Detection Policy 220 which includes sniffing techniques to detect a problem or event indicative of a virtual machine failure within a virtual machine network infrastructure, including a Network Functional Component 293, a Pooling and Virtualization Layer 292 and a Physical and Logical Resources Layer 294.

The FRPE 210 also includes a Root-Cause Analysis (RCA) Policy 230. The RCA policy 230 includes troubleshooting process flow and rules to isolate the problem and a decision tree to walk through to pinpoint the root cause of the problem from hundreds of traps within the Physical and Logical Resources layer 294 and Pooling and Virtualization layer 292 of the virtual machine network infrastructure. The RCA Policy 230 includes trouble correlation rules for failure detection and problem identification based on monitoring alarms and performance statistics. Examples of faults that may case virtual machine failure include virtual machines processing failure (bring up, stop, shutdown, remove from a cluster failure), multiple virtual machine failures, load balancing failures, server blade equipment failures, SIP interface down, VLAN failure, etc. The RCA Policy 230 provides correlation rules to determine a root-cause of failures, such as virtual machine fault identification, VNF fault identification, or infrastructure fault detection including faults in transport mechanisms and hardware.

Both the Fault Detection Policy 220 and the RCA Policy 230 use signatures on which various policy rules can be defined to direct the FRPE 210 to act based on a type of tenant, type of function, type of event, severity of event, source of events, progression of events (persistence, repeated pattern, spreading etc.), and clarity or confidence level of root cause identification.

The FRPE 210 also includes a Life Cycle and Fault Recovery Policy 240. The Life Cycle and Fault Recovery Policy 240 includes intelligent orchestration rules based on failover scenarios to facilitate interactions between the VNF Orchestrator 290 and the Infrastructure Orchestrator 295 and route an update policy when a virtual machine is moved. The Life Cycle and Fault Recovery Policy 240 decides whether to create, start, migrate, pause, resume, stop and destroy a virtual machine with a priority and timing based, e.g., on a type of virtual machine exhibiting a failure and a criticality of its functions. The virtual machine restoration action sequence, which is described in more detail with reference to FIGS. 3, 4, 7 and 8 includes rebooting an application virtual machine, rebooting a guest operating system and application virtual machine, rebooting a host operating system, hypervisor and all virtual machines, restoring virtual machines to other hosts/sites, etc. If the survivor host crashes, the virtual machine operating system may be restored on the same network node. The policy for determining the location of a restored virtual machine is handled by the Move Where Policy 270, described in detail below.

The Fault Responding Policy Engine 210 also includes an Operational Policy 250, also referred to herein as a virtual machine Fault Management Orchestration Policy. The Operational Policy 250 includes rules to support day-to-day operations of the cloud infrastructure, including a strategic rule to determine when and where to intervene with manual processes or perform repairs/restoration automatically. The Operational Policy 250 also determines the level of reach of event reports and notifications including the level of escalation to reach responsive to a reported event/problem.

The FRPE 210 further includes a Failover Protection Policy, also referred to as a Virtual Machine Control Policy 260. This includes control mechanisms for virtual machine provisioning to prevent virtual machine spawning from exhausting resources as explained in further detail below with reference to FIG. 4.

The FRPE 210 also includes a Move Where Policy 270 and a Topology Repository 275. The Move where Policy 270 is used to determine when a new instance of a virtual machine is desired/preferred and where a new instance of a virtual machine that has experienced failure is desired/preferred based, e.g., on the type of the virtual machine and function of the virtual machine. The Move Where Policy 270 determines whether to allow the virtual machine on the same host, the same zone, the sane site, or a different site with a limit of IP routing distance. The Move Where Policy 270 uses information stored in the Topology Repository 275 to make such a determination. The Topology Repository 275 is a database with information identifying host servers, zones or sub domain, tenants, sites, IP connections (VLAN availability) and route distance/latency matrix for the virtual machine network.

Also shown in FIG. 1 are a Work Center 285 (also referred to herein as a Network Operations Center (NOC) Work Center), a Work Flow Engine 280, a Virtual Network Function (VNF) Orchestrator 290, and an Infrastructure Orchestrator 295. The Work Flow Engine 280 manages workflow of network functional components 293 in conjunction with the Operational Policy 250. The Work Flow Engine 280 provides trouble tickets and notification to the Work Center 285 and consults the FRPE 210 for a fault recovery strategy. The Work Center 285 manages network resources, including the network infrastructure supporting the virtual machine network. The VNF Orchestrator 290 manages the deployments of VNFs on the virtual network infrastructure in conjunction with the VM Control Policy 260, and the Infrastructure Orchestrator 295 manages the virtual network infrastructure, including the Pooling and Virtualization Layer 292 and the Physical and Logical Resources Layer 294.

Figure 2:
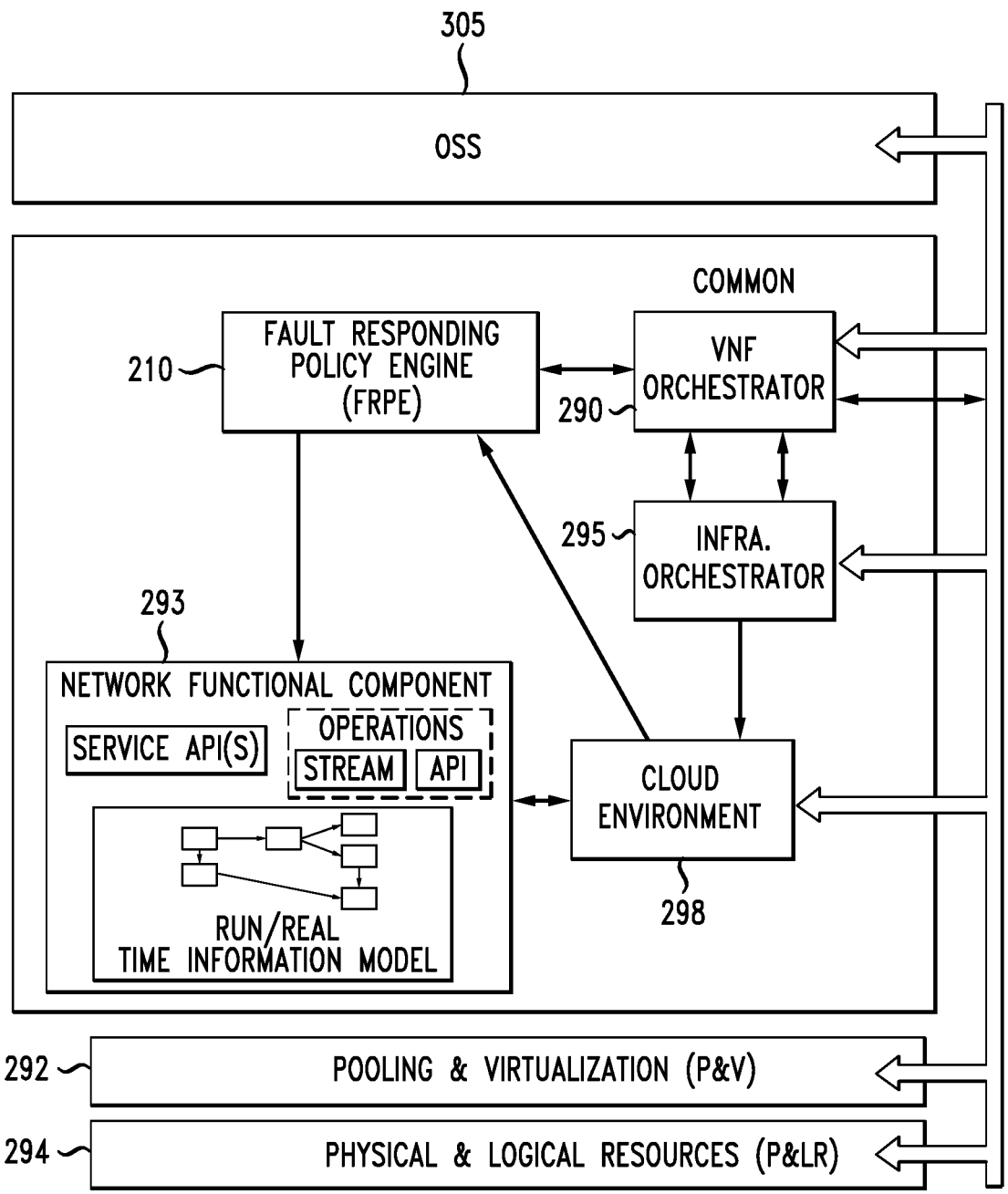
FIG. 2 illustrates a flow of a virtual machine life cycle and fault management orchestration policy according to an illustrative embodiment.

FIG. 2 illustrates a flow of a virtual machine life cycle and fault management orchestration policy according to an illustrative embodiment. Referring to FIG. 2, if a virtual machine within a cloud environment 298 fails due to a crash or processing failures, an alarm is sent to the FRPE 210. Although not shown in FIG. 2 in the interest of simplicity of illustration, it should be appreciated that the description herein is also applicable to virtual machine failure within a virtual network supported by a cellular network. This is described and illustrated in detail below with reference to FIG. 6.

Next, if the FRPE decides to instantiate a new virtual machine, the Life Cycle and Fault Recovery Policy 240 within the FRPE 210 provides a dynamic arrangement of virtual machines of a function node to the hardware with the most available resources at the time. The FRPE 210 then executes the Move Where Policy 270 and sends a request to the VNF Orchestrator 280 for a new virtual machine.

Responsive to the request from the FRPE 210, the VNF Orchestrator 290 selects a catalog template from the Topology Repository 275 for the new virtual machine and sends the request to the Infrastructure Orchestrator 295. Then, the Infrastructure Orchestrator 295 communicates with the cloud environment 298 to instantiate the new virtual machine.

Next, a server within the cloud 298 assigns an Internet Protocol (IP) address to the new virtual machine from the common infrastructure data repository supported by the Operation Support System (OSS) 305. The VNF Orchestrator 290 and the FRPE 210 also obtain an IP address for the virtual machine from the network cloud supported by the OSS 305. Then, the FRPE 210 uses the IP address to reach the virtual machine on the network functional component 293 and install the application Next, the FRPE 210 performs a route update to the WAN PE (not shown).

Subsequently, a call is made by the FRPE 210 to verify the result, and then the route is set so that the new virtual machine can operate. Finally, the virtual machine configuration is loaded into the topology repository 275, and the new virtual machine is then ready for traffic.

Figure 3:
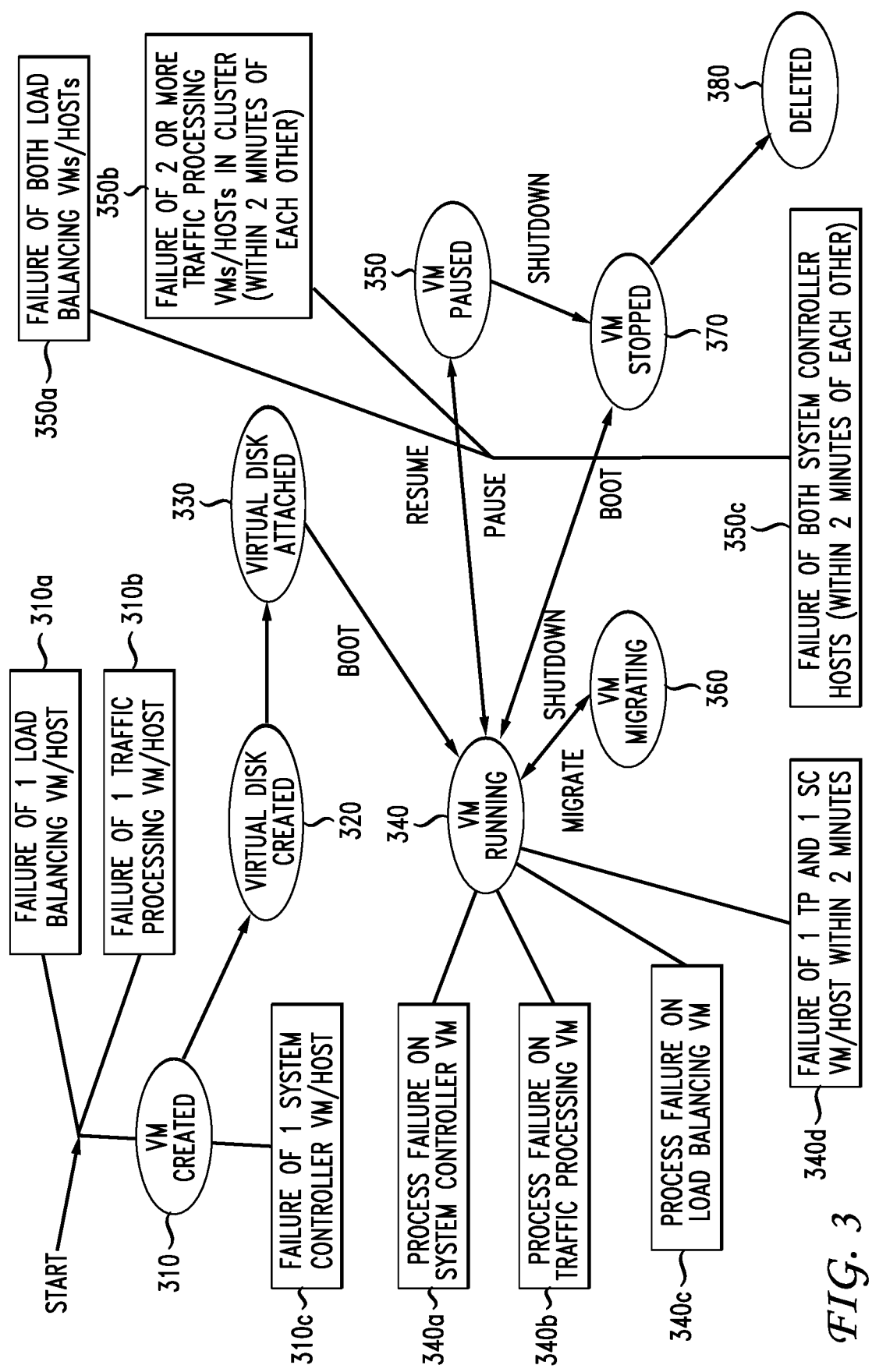
FIG. 3 illustrates a virtual machine life cycle and failure recovery path and conditions that may occur that affect the life cycle according to an illustrative embodiment.

FIG. 3 illustrates stages of a virtual machine life cycle and failure recovery path and conditions that may occur that affect the stages of the life cycle according to an illustrative embodiment. Referring to FIG. 3, a virtual machine is created or instantiated on a host at stage 310. At this stage, various conditions may occur that will cause the virtual machine to be recreated. For example, occurrence of a condition 310a involving failure of a load balancing virtual machine or host will cause the virtual machine to be reinstantiated. The occurrence of a condition 310b involving failure of traffic processing by the virtual machine or host will also cause the virtual machine to be recreated. The occurrence of a condition 310c involving the failure of a system controller virtual machine or host will also cause the virtual machine to be recreated.

After the virtual machine is successfully created, the virtual disk is created at stage 320, and the virtual disk is attached as a guest operating system to a host at stage 330. After the virtual disk is attached, the virtual machine is booted and begins running at stage 340. At this stage, the occurrence of various conditions may cause the virtual machine to be rebooted.

For example, the occurrence of a condition 440a involving process failure on a system controller virtual machine will cause the guest operating system to restart. Also, the occurrence of a condition 340b involving process failure on a traffic processing virtual machine will cause the guest operating system to restart. In addition, the occurrence of a condition 340c involving processor failure on a load balancing virtual machine will cause the guest operating system to restart. Further, the occurrence of a condition 340d involving the failure of a traffic processing virtual machine/host and a system controller virtual machine/host within a time period of, e.g., two minutes, will cause the virtual machine to restart.

While the virtual machine is running at stage 340, the occurrence of other conditions involving failures may cause the virtual machine to be paused at stage 350 until the failure is corrected. For example, the occurrence of a condition 350a involving failure of both a load balancing virtual machine and host will cause the virtual machine to be paused. In addition, the occurrence of a condition 350b involving the failure of two or more traffic processing virtual machines or hosts in a cluster (within, e.g., two minutes of each other) may cause the virtual machine to pause. Further, the occurrence of a condition 350c involving the failure of both the system controller virtual machine and host within, e.g., two minutes of each other, may cause the virtual machine to pause. If any of the conditions 350a, 350b, or 350c occurs and the failure is corrected, operation of the virtual machine is resumed. Otherwise, the virtual machine may be stopped at stage 370 and deleted at stage 380.

Figure 4:
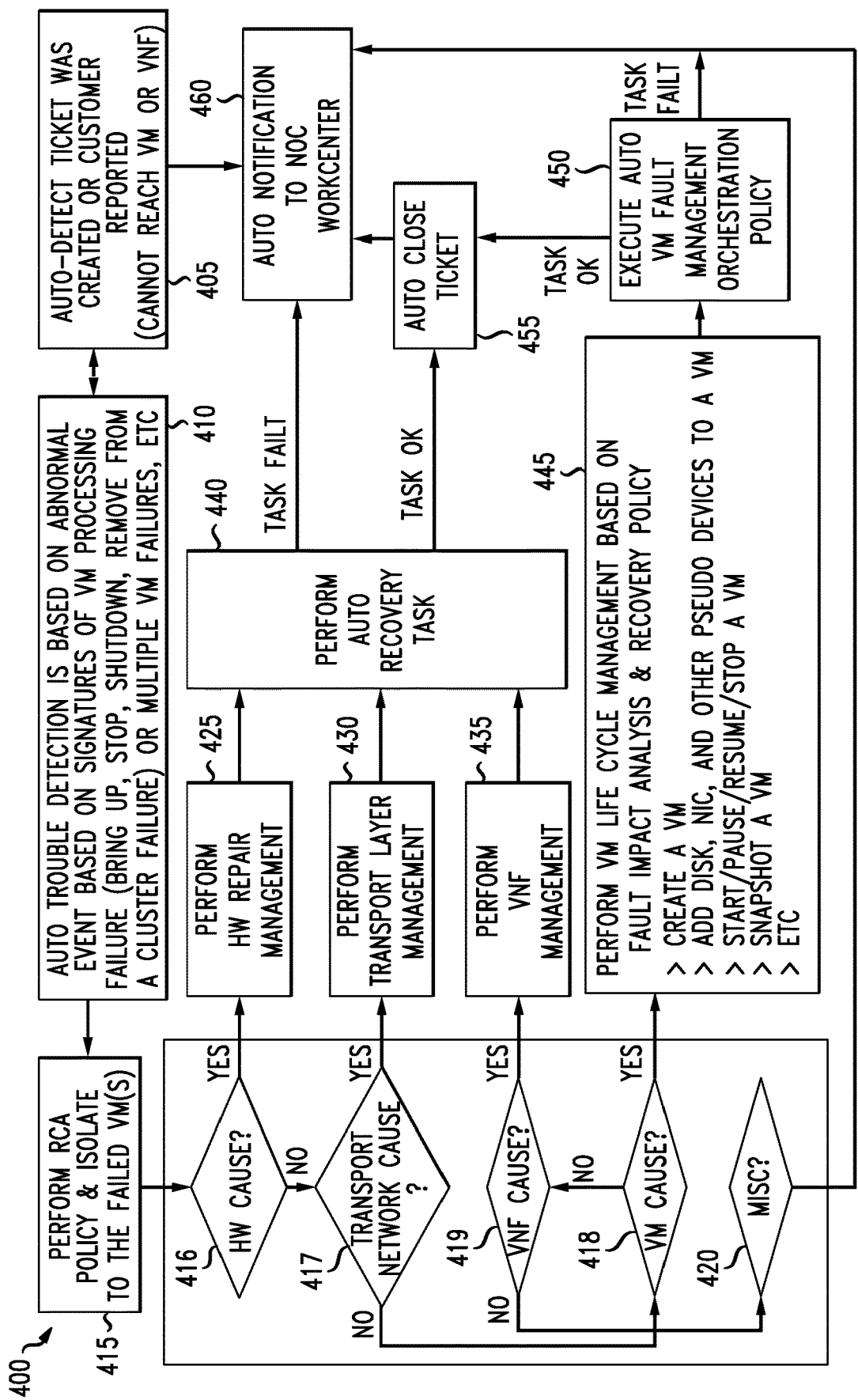
FIG. 4 illustrates a process performed by a fault responding policy engine according to an illustrative embodiment.

While the virtual machine is running, the occurrence of some of the afore-mentioned conditions or other conditions may cause the virtual machine to be migrated to another host at stage 360. For example, the occurrence of the condition 350a involving the failure of both the load balancing virtual machine and host may cause the virtual machine to be paused and restarted, triggering migration of the virtual machine to another host that is on-site or another host that is part of an on-site cluster FIG. 4 illustrate a process which may be performed by the FRPE 210 according to an illustrative embodiment. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 4, the process 400 begins at step 405 at which a ticket is created responsive to detection of a virtual machine failure or a report of a virtual machine failure by a user or customer, e.g., in case the user or customer cannot reach the virtual machine or VNF. The NOC Work Center 285 is automatically notified of the ticket at step 460.

From step 405, trouble detection is performed at step 410. Trouble detection may be performed by the Fault Detection Policy 220 of the FRPE 210. Trouble detection is based on detection of an abnormal event indicative of failure of a virtual machine based on signatures of the virtual machines and network elements, as described in more detail below with reference to FIG. 5.

At step 415, root cause analysis is performed to determine a cause of a failure. This step may be performed by the RCA Policy 230. The cause may be determined based on a fault signature associated with the detected fault. Root cause analysis includes steps 416-420.

At step 416, a determination is made whether the fault is due to a hardware failure. If so, hardware repair management is performed at step 425 to initiate hardware repair, and an automatic recovery task is performed at step 440. Steps 425 and 440 may be performed by the Life Cycle and Fault Recovery Policy 240 and the Operational Policy 250

If the fault is not due to a hardware cause, a determination is made whether the fault is due to a network transport mechanism at step 417. If so, transport layer management is performed at step 430 to initiate repair of a network transport mechanism, and an automatic recovery task is performed at step 440. Steps 430 and 440 may be performed by the Life Cycle and Fault Recovery Policy 240 and the Operational Policy 250.

If the fault is determined not to be due to a transport mechanism, a determination is made at step 418 whether the fault is due to a virtual machine. If so, virtual machine life cycle management is performed at step 445, e.g., by the Life Cycle and Fault Recovery Policy 240 and the Move Where Policy 270. Automatic virtual machine fault management orchestration is performed at step 450 by, e.g., the Operational Policy 250 and the VM Control Policy 260.

The VM Control Policy 260 provides control mechanisms for virtual machine provisioning as follows. If the condition of system performance of a virtual machine provisioning task is degraded, pre-configured rules may be applied to set a priority and internal overload tasks. If the condition of system performance still does not improved, external overload tasks are removed.

If the fault is determined not to be caused by a virtual machine, a determination is made at step 419 whether the fault is due to a VNF. If so, VNF management is performed at step 435, and an auto recovery task is performed at step

440. Steps 435 and 445 may be performed by the Life Cycle and Fault Recovery Policy 240 and the Operational Policy 250.

If the fault is determined not to be due to a VNF, a determination is made whether the fault is due to some other miscellaneous cause at step 420. This determination may be made by the RCA Policy. A notification is sent to the NOC Work Center 285 via, e.g., the Operational Policy 250 and the Work Flow Engine 280, at step 460.

From step 440, if the auto recovery task fails, the NOC Work Center 285 is automatically notified at step 460 via, e.g., the Operational Policy 250 and the Work Flow Engine 280. If the automatic recovery task is okay, the trouble ticket is closed at step 455, and a notification is sent to the NOC Work Center 285 at step 460.

Figure 5:
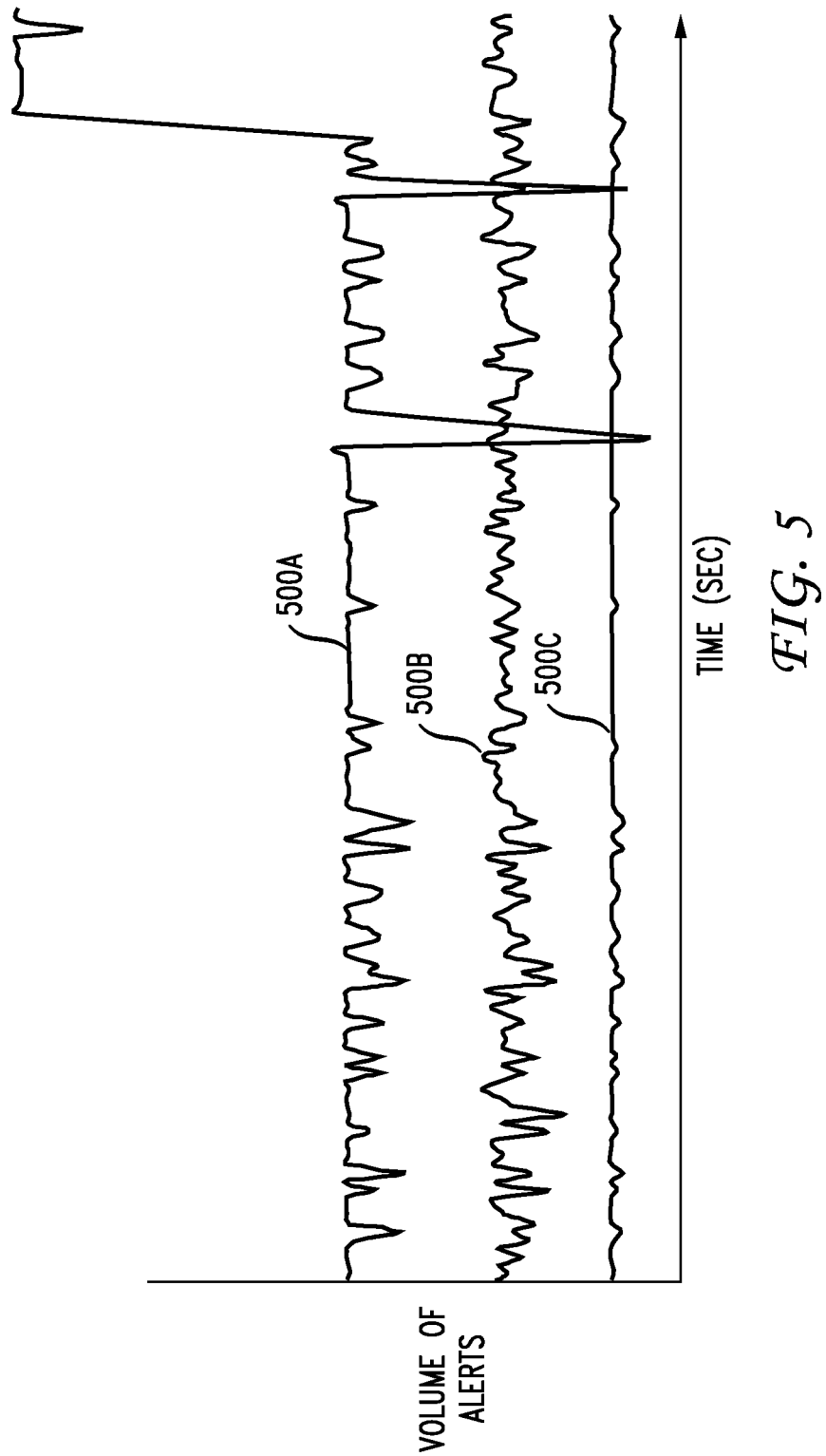
FIG. 5 is a graph illustrating examples of fault signatures according to an illustrative embodiment.

FIG. 5 is a graph illustrating examples of fault signatures according to an illustrative embodiment. In the graph shown in FIG. 5, the x axis represents time in seconds, and the y axis represents a volume of alerts/alarms from a particular source in a virtual machine network infrastructure. The fault signatures shown in FIG. 5 represent the number of alerts/alarms indicative of failure of operation of a virtual machine from various sources over time. According to illustrative embodiments, there are fault signatures that correspond to problems in virtual machine processing (e.g., bring up, stop, shutdown, remove from a cluster failure) and fault signatures that correspond to a network element failure (e.g., down alarms and not reachable alerts). There may be many relationships between each virtual machine failure signature and network element failure signature.

As shown in FIG. 5, the fault signatures 500A, 500B and 500C represent fault signatures with a significant number of alerts within a given amount of time, e.g., two minutes. As an illustrative example, the fault signature 500A may indicate a virtual machine lost event as reported by a virtual machine. The fault signature 500B may indicate a virtual machine is not reachable as reported by a network element, and the fault signature 500C may indicate failure of an NVF application as reported by a network element. Based on the fault signatures, the RCA Policy 230 can determine a root cause of a failure and secondary causes.

In the example shown in FIG. 5, the number of alerts in the fault signature 600a for the virtual machine lost event is greater than any other fault signatures. Thus, the RCA Policy 230 would deem the failure of operation of the virtual machine to be due to a fault of the virtual machine. Based on the fault signatures 600b and 600c, the RCA Policy 230 would deem the faults of network elements to be secondary causes of the failure. Based on the root cause of the failure determined by the RCA Policy 230, the Life Cycle and Fault Recovery Policy 240 would be performed to instantiate a new virtual machine and add it to the cluster.

As another example (not shown), fault signatures from many virtual machines may indicate a large number of lost events. In this example, the RCA Policy 230 may deem that the cause of the failure of the virtual machine is not due to faults the virtual machines but rather due to a network event, e.g., a cable cut. Based on the root cause of the failure determined by the RCA Policy 230, the Life Cycle and Fault Recovery Policy 240 would be performed to provide instructions to repair the cable.

Figure 6:
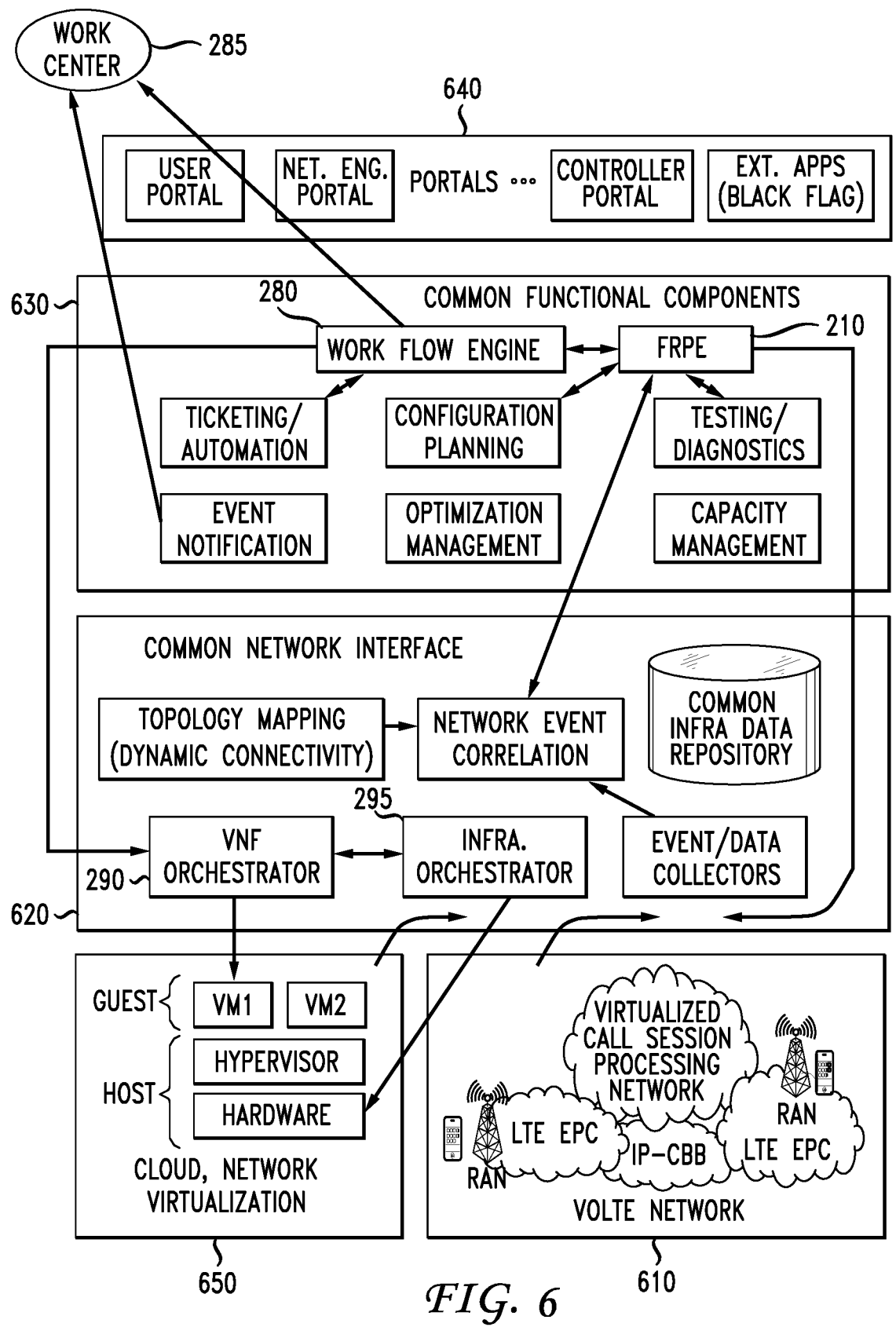
FIG. 6 illustrates an environment including a work flow engine for trouble recovery and a flow of trouble recovery according to an illustrative embodiment.

FIG. 6 illustrates an environment in which a work flow engine for fault recovery may be implemented and a flow of trouble recovery according to an illustrative embodiment. In the environment shown in FIG. 6, the Work Flow Engine 280 communicates with common functional components 630 and the FRPE 210. The common functional components 630 may include a ticketing/automation components, an event notification component, a configuration planning component, an optimization management component, a testing/diagnostic component, and a capacity management component. The common functional components 630 may be implemented with one or more computing devices, such as that shown in FIG. 9, and correspond to the network functional components 293 shown in FIG. 2.

The common functional components 630 interface with portals 640 including a user portal, a network engine portal, a controller portal and external applications. The portals 640 provide an interface to the Work Center 285.

The environment shown in FIG. 6 also includes common network interfaces 620. The common network interfaces include a topology mapping component, a network event correlator, the VNF Orchestrator 290, the Infrastructure Orchestrator 295, event data collectors and a common infrastructure data repository.

The common network interfaces 620 provide an interface to the cloud 650 (which may be the same as the cloud environment 298 shown in FIG. 1) and one or more cellular networks, e.g., a Voice Over Long Term Evolution (VOLTE) Network 610. The cloud 650 and the cellular network(s) 610 may include hardware and software that make up an NVF Infrastructure to support a virtual network as described above.

It should be appreciated that the VOLTE Network 610 is illustrated as an example of a cellular network. It should be understood, however, that this disclosure is applicable to other types of cellular networks using any existing or yet to be developed telecommunications technology. Such a cellular network may operate according a protocol dictated by telecommunications standards, such as other suitable cellular telecommunications technologies include, but are not limited to, Time Division Multiple Access (TDMA), Frequency Division Multiple Access (FDMA), Wideband Code Division Multiple Access (WCDMA), Orthogonal Frequency Division Multiplexing (OFDM), Global System for Mobile communications (GSM) and a Universal Mobile Telecommunications System (UMTS). Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

For illustrative purpose, a use case of fault recovery will be described with reference to FIG. 6. The use case involves the failure of a transport mechanism within the VOLTE network 610. Referring to FIG. 6, upon detection of an IP transport mechanism failure within the VOLTE network 610, events are trapped from the impacted host OS, e.g., Internet Control Message Protocol (ICMP) events. Events are also trapped from hosted application virtual machines due to failure of application level communications between peers from the cloud 650.

Next, trapped events are received at the Event Data Collectors of the Common Network Interfaces 620, along with events and notifications. Event correlation is then started at the Network Event Correlation component of the Common Network Interfaces 620. Correlation results are provided from the Network Event Correlation component to the FRPE 210.

Next, topology mapping information is obtained from the Topology Mapping component of the Common Network Interfaces 620 to identify a possible root cause. Then, testing is kicked off or diagnostic tools are used to verify and isolate the root cause via the Work Flow Engine 280.

Next, ticketing and notifications are sent to the responsible OSS teams via the Work Flow Engine 280. Then, the FRPE 210 is consulted for a recovery strategy. The Configuration Planning component of the Common Functional components 630 is then consulted to find the proper service and resources catalog.

Next, the VNF Orchestrator 290 and the Infrastructure Orchestrator 295 communicate with network elements in the cloud 650, including virtual machines and hosts, to instantiate a new service application virtual machine on a part of the infrastructure that is not impacted by the network transport mechanism fault. The VNF Orchestrator 290 and the Infrastructure Orchestrator 295 work the new instance of the virtual machine into the cloud 650. The new service may be on the same site or a remote site based on the root cause information and the policy decision. Finally, the OSS team is informed on the recovery state of the virtual machine and the new network configuration.

FIGS. 7 and 8 illustrate examples of fault conditions, recovery strategies, and impact according to an illustrative embodiment. In FIGS. 7 and 8, examples of conditions of failure, the recovery task performed, and the impact are shown. It should be appreciated that the disclosure is not limited to these specific examples. There may be any number of fault conditions, recovery tasks, and impacts.

Referring to FIG. 7, responsive to the occurrence of a first condition involving of traffic processing failure by the virtual machine, the process is restarted by the guest operating system. The impact is that transient calls being handled are lost but stable calls are preserved.

Responsive to the occurrence of a second condition involving the failure of traffic processing by one virtual machine/host, the guest operating system detects the failure and sends an alarm to the FRPE 210. The FRPE 210 instantiates a new virtual machine and adds it to the cluster. The guest operating system middleware detects the addition of the virtual machine. The impact is that transient calls being handled are lost but stable calls are preserved.

Responsive to the occurrence of a third condition involving the failure of two or more traffic processing virtual machines/hosts in a cluster (within, e.g., two minutes of each other), the guest operating system detects the fault, the cluster is restarted. Traffic is handled by the rest of the clusters (on-site and/or across both redundant sites). The impact is that all calls being handled by the cluster are lost.

Responsive to the occurrence of a fourth condition involving process failure on load balancing a virtual machine, the process is restarted by the guest operating system. There is no impact to calls.

Responsive to occurrence of a firth condition involving the failure of one load balancing virtual machine/host, all requests are routed to another load balancer, and an alarm is sent to the FRPE 210. A new virtual machine is instantiated and added to the cluster. The guest operating system detects the addition of the new virtual machine, and there is no impact to calls.

Responsive to occurrence of a sixth condition involving the failure of load balancing by both the virtual machines and hosts, the failure is detected by the guest operating system, and the cluster is restarted. Failover is trigger to another site or another on-site cluster. The impact is that all calls being handled by the cluster are lost.

Referring to FIG. 8, responsive to the occurrence of a seventh condition involving the failure on a system controller virtual machine, the process is restored by the guest operating system. There is no impact to calls.

Responsive to the occurrence of an eighth condition involving the failure of one system controller virtual machine or host, an alarm is sent to the FRPE 210, and the FRPE 210 instantiates a new virtual machine and adds it to the cluster. The guest operating system detects the addition of the new virtual machine. There is no impact to calls.

Responsive to the occurrence of a ninth condition involving the failure of both the system controller hosts within, e.g., two minutes of each other, traffic is handled by the rest of the clusters (on-site and/or across both redundant sites. All calls being handled by the cluster are lost.

Responsive to the occurrence involving the failure of one traffic processing virtual machine/host and one system controller virtual machine/host within, e.g., two minutes, the guest operating system detected the failure and sends an alarm to the FRPE 210. The FRPE 210 instantiates a new virtual machine and adds it to the cluster. The guest operating system middleware detects the addition of the virtual machine. There is no impact to calls.

Figure 9:
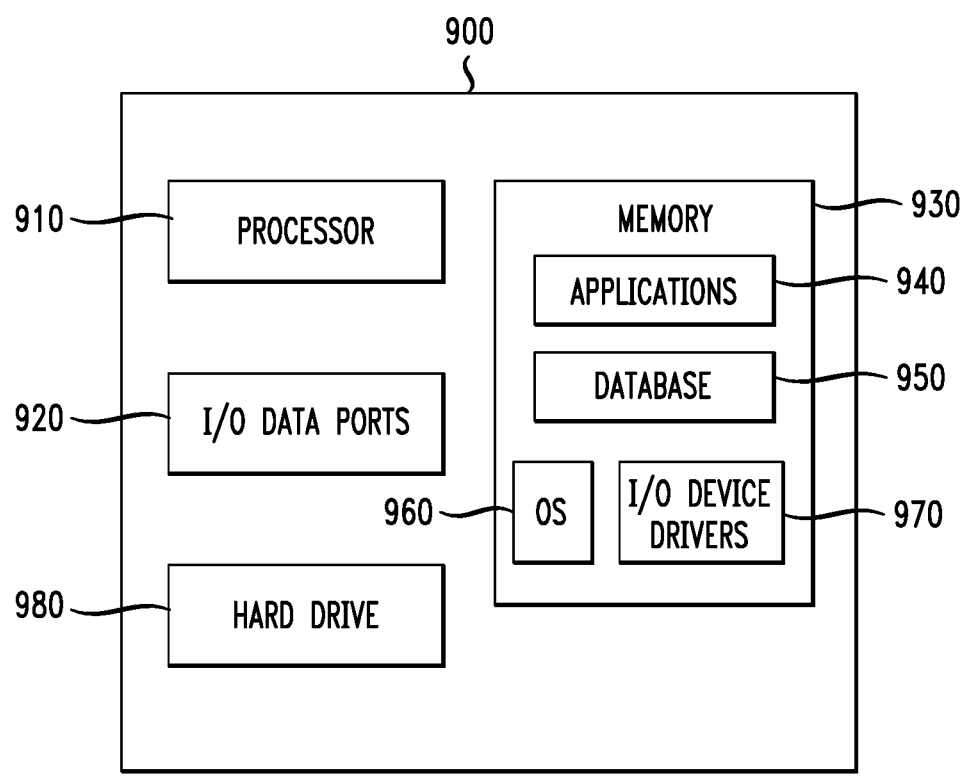
FIG. 9 illustrates a block diagram of a computing device with which a fault responding policy engine may be implemented according to an illustrative embodiment.

FIG. 9 is a block diagram of a computing device with which the FRPE 210 may be implemented according to illustrative embodiments. Although no connections are shown between the components illustrated in FIG. 9, those skilled in the art will appreciate that the components can interact with each other via any suitable connections to carry out device functions.

It should be understood that FIG. 9 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, include non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the components shown in FIG. 9.

According to an illustrative embodiment, the computing device 800 may be implemented in any suitable computing device and on any suitable network. For example, the computing device 900 may be implemented as a server in the network 160 in communication with the over, e.g., Internet connections.

Referring to FIG. 9, the computing device 900 includes a processor 910. The processor 910 can be any commercially available or custom microprocessor. Although only one processor is shown for simplicity of illustration, it should be appreciated that there may be multiple processors, which could include distributed processors or parallel processors in a single machine or multiple machines. The processor 910 may be used in supporting a virtual processing environment. Also, the processor may include a state machine, an application specific integrated circuit (ASIC), programmable gate array (PGA) including a Field PGA, or state machine.

The processor 910 executes instructions stored in the memory 930 to perform operations. It should be appreciated that performance of these operations may include the processor performing the operations directly and/or facilitating, directing, or cooperating with another device or component to perform the operations.

Referring again to FIG. 9, the processor 910 receives information from the virtual network infrastructure via the Common Network Interfaces 620 and the Common Functional Components 630 via I/O Data Ports 920. This information incudes e.g., alarms generated responsive to events indicating failure of a virtual machine, correlated with other events, as described above.

The processor 910 also transmits information to the virtual network infrastructure via the Common Network Interfaces 620 and the Common Functional Components 630 via the I/O Data Ports 920. This information includes, e.g., instructions for initiating recovery from a virtual machine failure (e.g., instructions to migrate a virtual machine, remove a virtual machine, repair network infrastructure, etc.) as described above.

The processor also receives and transmits information to the Common Functional Components 630 and the Common Network Interfaces 620 as described above via the I/O Data Ports 920. This information may include correlation results, topology mapping, testing and diagnostic information and configuration planning. This information may also include ticketing and notification information to be reported to the Work Center 285 via the Work Flow Engine 280 as described above.

According to an illustrative embodiment, the processor 910 performs root cause analysis and virtual machine life cycle recovery as described above. The processor 910 also performs the other policies included in the FRPE 210 as described above.

The processor 910 transmits instructions for virtual machine recovery via the I/O Data Ports 920. The I/O Data Ports 920 can be implemented with, e.g., an interface including an antenna or other suitable type of transceiver through which data and signals may be transmitted and received wired and/or wirelessly.

The computing device 900 also includes a physical hard drive 980. The processor 910 communicates with the memory 930 and the hard drive 980 via, e.g., an address/data bus (not shown). The memory is 930 is representative of the overall hierarchy of memory devices containing the software and data used to implement the functionality of the device 900. The memory 930 can include, but is not limited to the types of memory devices described above. As shown in FIG. 9, the memory 930 may include several categories of software and data used in the device 900, including applications 940, a database 950, an operating system (OS) 960, and input/output (I/O) device drivers 970.

The I/O device drivers 970 may include various routines accessed through at least one of the OS 960 by the applications 940 to communicate with devices and certain memory components.

The applications 940 can be stored in the memory 920 and/or in a firmware (not shown) as executable instructions, and can be executed by the processor 920. The applications 940 include various programs that implement the various features of the device 900. The applications 940 may include applications for implementing the Operational Policy 250, the Life Cycle and Fault Recovery Policy 240, the Virtual Machine Control Policy 260, the Move Where Policy 270, the RCA Policy 230, and the Fault Detection Policy 220.

The database 950 represents the static and dynamic data used by the applications 940, the OS 960, the I/O device drivers 970 and other software programs that may reside in the memory. The database 950 may be used to store data including the Topology Repository 275 and rules used in executing the Fault Detection Policy 220, the RCA Policy, 230, the Move Where Policy 270, the Virtual Machine Control Policy 260, the Operational Policy 250 and the Life Cycle and Fault Recovery Policy 240.

While the memory 930 is illustrated as residing proximate the processor 910, it should be understood that at least a portion of the memory 930 can be a remotely accessed storage system, for example, another server in the cloud 750, a remote hard disk drive, a removable storage medium, combinations thereof, and the like. Thus, any of the data, applications, and/or software described above can be stored within the memory 930 and/or accessed via network connections to other data processing systems (not shown) that may include a local area network (LAN), a metropolitan area network (MAN), or a wide area network (WAN), for example.

Although not illustrated, it should be appreciated that other components described may be implemented with a computing device similar to that shown in FIG. 9. For example, the Work Flow Engine 280, the VNF Orchestrator 290, and the Infrastructure Orchestrator 295 may contain a processor and a memory having applications including instructions which, when executed by the processor, cause the processor to perform operations to execute the policies as described above.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method comprising:
   detecting, by a processing system including at least one processor, a failure of operation of a virtual machine among a plurality of different types of virtual machines operating in a virtual machine network, wherein the virtual machine network comprises a plurality of network elements;
   determining, by the processing system, a cause of the failure of operation of the virtual machine via a fault signature, wherein the determining the cause of the failure includes identifying the cause of the failure from among a plurality of possible causes which include:
      a fault of a network element of the plurality of network elements;
      a fault of the virtual machine;
      a fault of a virtual application being executed by the virtual machine; and
      a fault of a transport mechanism serving the virtual machine network;

initiating, by the processing system, a recovery of the virtual machine based on the cause of the failure that is determined, wherein when the cause of the failure is determined to be the fault of the virtual machine, the initiating the recovery of the virtual machine includes selecting between whether to: restore operation of the virtual machine or stop operation of the virtual machine and replace the virtual machine with a new virtual machine; and responsive to a selection to stop operation of the virtual machine and replace the virtual machine with the new virtual machine, determining, by the processing system, whether to instantiate the new virtual machine on a same network element on which the failure of operation of the virtual machine occurs or to instantiate the new virtual machine on a new network element, wherein the determining whether to instantiate the new virtual machine on the same network element or to instantiate the new virtual machine on the new network element is based upon a type of the virtual machine from among the plurality of different types of virtual machines.

2. The method of claim 1, further comprising, responsive to a determination to instantiate the new virtual machine on the new network element, identifying the new network element on which to instantiate the new virtual machine based on the type of the virtual machine or a function of the virtual machine.

3. The method of claim 1, further comprising:
correlating the cause of the failure of operation of the virtual machine with causes of failures of operation of other virtual machines in the virtual machine network, wherein the initiating the recovery of the virtual machine is also based on a result of the correlating.

4. The method of claim 1, wherein the selecting between whether to restore operation of the virtual machine or stop operation of the virtual machine and replace the virtual machine with the new virtual machine is based upon the type of the virtual machine from among the plurality of different types of virtual machines.

5. The method of claim 1, wherein the virtual machine comprises a load balancer virtual machine.

6. The method of claim 1, wherein the virtual machine comprises a database virtual machine.

7. The method of claim 1, wherein the virtual machine comprises a caching virtual machine.

8. The method of claim 1, wherein the virtual machine comprises a proxy virtual machine.

9. The method of claim 1, wherein the virtual machine comprises an operations virtual machine.

10. The method of claim 1, wherein the virtual machine comprises an administration virtual machine.

11. The method of claim 1, wherein the virtual machine comprises a maintenance virtual machine.

12. The method of claim 1, wherein the virtual machine comprises a control virtual machine.

13. The method of claim 1, wherein the virtual machine comprises a monitoring virtual machine.

14. A system comprising:
a processor; and
a memory having instructions stored thereon which, when executed by the processor, cause the processor to perform operations, the operations comprising:
detecting a failure of operation of a virtual machine among a plurality of different types of virtual machines operating in a virtual machine network, wherein the virtual machine network comprises a plurality of network elements;
determining a cause of the failure of operation of the virtual machine via a fault signature, wherein the determining the cause of the failure includes identifying the cause of the failure from among a plurality of possible causes which include:
a fault of a network element of the plurality of network elements;
a fault of the virtual machine;
a fault of a virtual application being executed by the virtual machine; and
a fault of a transport mechanism serving the virtual machine network;
initiating a recovery of the virtual machine based on the cause of the failure that is determined, wherein when the cause of the failure is determined to be the fault of the virtual machine, the initiating the recovery of the virtual machine includes selecting between whether to: restore operation of the virtual machine or stop operation of the virtual machine and replace the virtual machine with a new virtual machine; and
responsive to a selection to stop operation of the virtual machine and replace the virtual machine with the new virtual machine, determining, by the processing system, whether to instantiate the new virtual machine on a same network element on which the failure of operation of the virtual machine occurs or to instantiate the new virtual machine on a new network element, wherein the determining whether to instantiate the new virtual machine on the same network element or to instantiate the new virtual machine on the new network element is based upon a type of the virtual machine from among the plurality of different types of virtual machines.

15. The system of claim 14, the operations further comprising, responsive to a determination to instantiate the new virtual machine on the new network element, identifying the new network element on which to instantiate the new virtual machine based on the type of the virtual machine or a function of the virtual machine.

16. The system of claim 14, the operations further comprising:
correlating the cause of the failure of operation of the virtual machine with causes of failures of operation of other virtual machines in the virtual machine network, wherein the initiating the recovery of the virtual machine is also based on a result of the correlating.

17. The system of claim 14, wherein the selecting between whether to restore operation of the virtual machine or stop operation of the virtual machine and replace the virtual machine with the new virtual machine is based upon the type of the virtual machine from among the plurality of different types of virtual machines.

18. A non-transitory computer readable storage device having instructions stored thereon which, when executed by a processor, cause the processor to perform operations, the operations comprising:
detecting a failure of operation of a virtual machine among a plurality of different types of virtual machines operating in a virtual machine network, wherein the virtual machine network comprises a plurality of network elements;
determining a cause of the failure of operation of the virtual machine via a fault signature, wherein the determining the cause of the failure includes identifying the cause of the failure from among a plurality of possible causes which include:
- a fault of a network element of the plurality of network elements;
- a fault of the virtual machine;
- a fault of a virtual application being executed by the virtual machine; and
- a fault of a transport mechanism serving the virtual machine network;

initiating a recovery of the virtual machine based on the cause of the failure that is determined, wherein when the cause of the failure is determined to be the fault of the virtual machine, the initiating the recovery of the virtual machine includes selecting between whether to: restore operation of the virtual machine or stop operation of the virtual machine and replace the virtual machine with a new virtual machine; and responsive to a selection to stop operation of the virtual machine and replace the virtual machine with the new virtual machine, determining, by the processing system, whether to instantiate the new virtual machine on a same network element on which the failure of operation of the virtual machine occurs or to instantiate the new virtual machine on a new network element, wherein the determining whether to instantiate the new virtual machine on the same network element or to instantiate the new virtual machine on the new network element is based upon a type of the virtual machine from among the plurality of different types of virtual machines.

19. The non-transitory computer readable storage device of claim 18, wherein the operations further comprise:
responsive to a determination to instantiate the new virtual machine on the new network element, identifying the new network element on which to instantiate the new virtual machine based on the type of the virtual machine or a function of the virtual machine.

20. The non-transitory computer readable storage device of claim 18, wherein the operations further comprise:
correlating the cause of the failure of operation of the virtual machine with causes of failures of operation of other virtual machines in the virtual machine network, wherein the initiating the recovery of the virtual machine is also based on a result of the correlating.

* * * * *